(12) United States Patent
Hamouda

(10) Patent No.: US 9,317,645 B2
(45) Date of Patent: Apr. 19, 2016

(54) METHODS FOR MODIFYING AN INTEGRATED CIRCUIT LAYOUT DESIGN

(71) Applicant: GLOBALFOUNDRIES, Inc., Grand Cayman, KY (US)

(72) Inventor: Ayman Hamouda, Fishkill, NY (US)

(73) Assignee: GLOBALFOUNDRIES, INC., Grand Cayman (KY)

( * ) Notice: Subject to any disclaimer, the term of this patent is extended or adjusted under 35 U.S.C. 154(b) by 325 days.

(21) Appl. No.: 13/955,300

(22) Filed: Jul. 31, 2013

(65) Prior Publication Data

US 2015/0040091 A1 Feb. 5, 2015

(51) Int. Cl.
*G06F 17/50* (2006.01)

(52) U.S. Cl.
CPC ........ *G06F 17/5072* (2013.01); *G06F 17/5077* (2013.01); *G06F 17/5081* (2013.01); *G06F 2217/72* (2013.01)

(58) Field of Classification Search
CPC ............ G06F 17/5045; G06F 17/5068; G06F 17/5072; G06F 17/5077; G06F 17/5081; G06F 2217/12

USPC ...................... 716/50–55, 100, 102, 110, 119
See application file for complete search history.

(56) References Cited

U.S. PATENT DOCUMENTS

| 7,799,487 | B2 | 9/2010 | Hamouda |
| 8,443,312 | B2 | 5/2013 | Tsai et al. |
| 8,468,482 | B1* | 6/2013 | Pack ................... G06F 17/5036 716/110 |
| 2010/0162194 | A1* | 6/2010 | Qian ................... G06F 17/5077 716/52 |

\* cited by examiner

*Primary Examiner* — Paul Dinh
(74) *Attorney, Agent, or Firm* — Ingrassia Fisher & Lorenz, P.C.

(57) ABSTRACT

Methods for modifying a layout design of an integrated circuit are provided. In one embodiment, a method for modifying an integrated circuit layout design includes providing an initial circuit layout design comprising a lower metal layer, an upper metal layer, and a first via electrically connecting the lower metal layer to the upper metal layer. The method further includes altering the initial circuit layout design by providing a second via, the second via being in electrical contact with no more than one of the upper metal layer and the lower metal layer, and the second via further being in proximity to the first via. Further, the method includes further altering the initial circuit layout design by providing a subresolution assist feature in proximity to the second via.

13 Claims, 18 Drawing Sheets

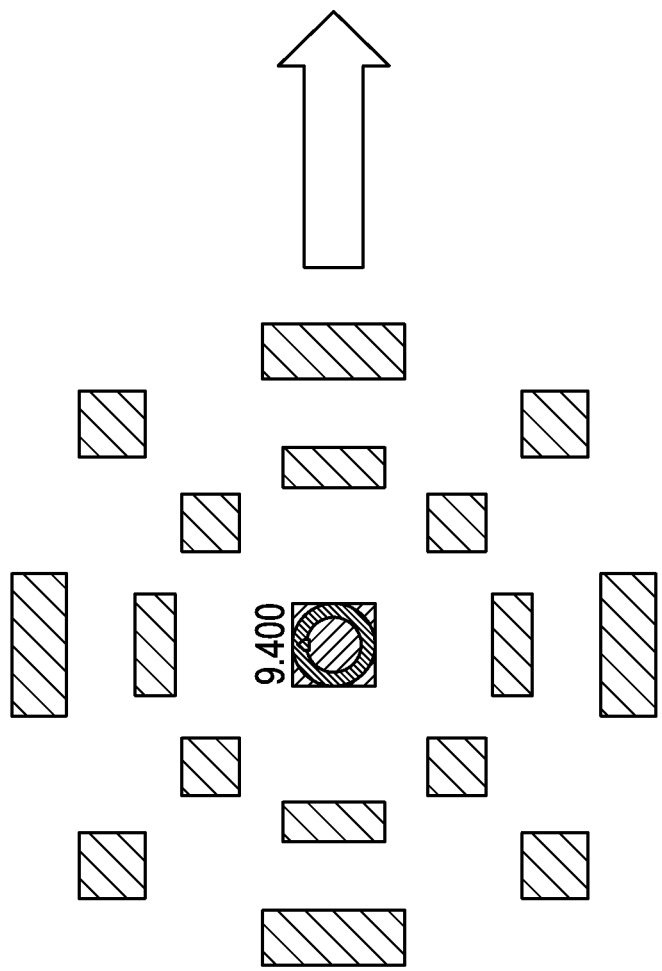
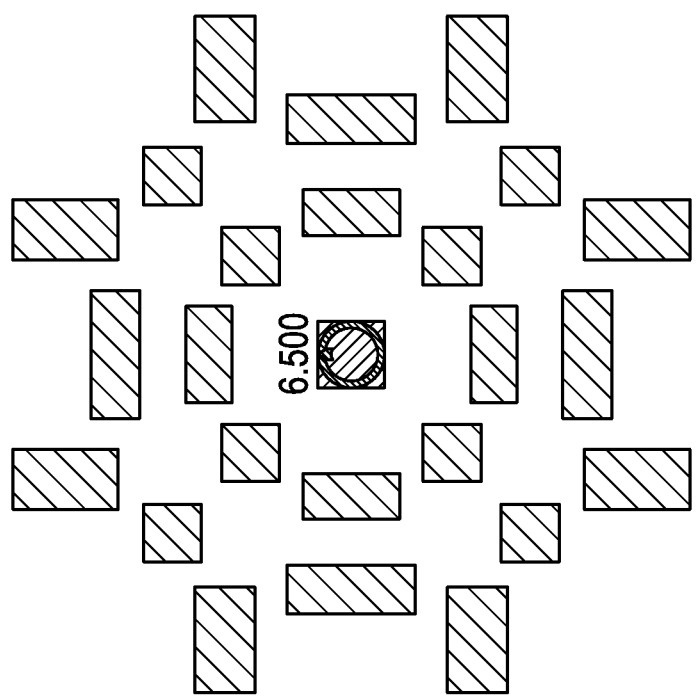
FIG. 3B
FIG. 3A

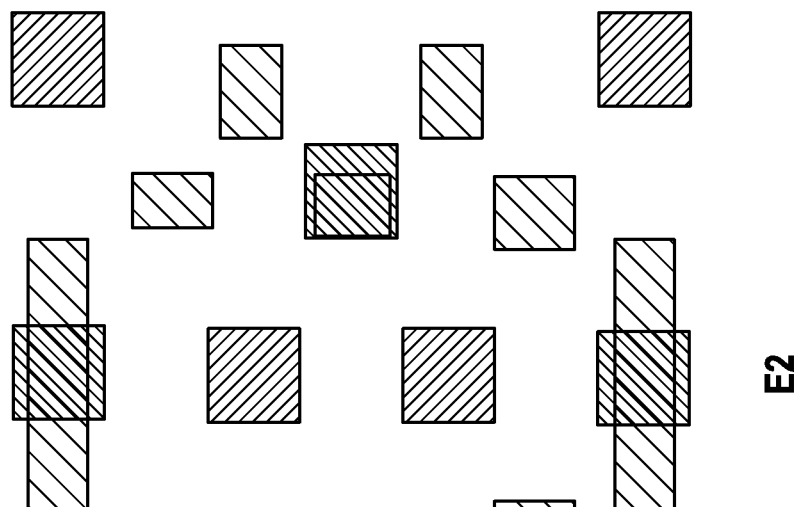
FIG. 12
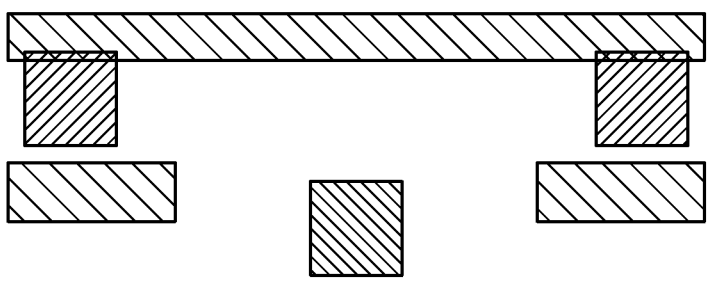
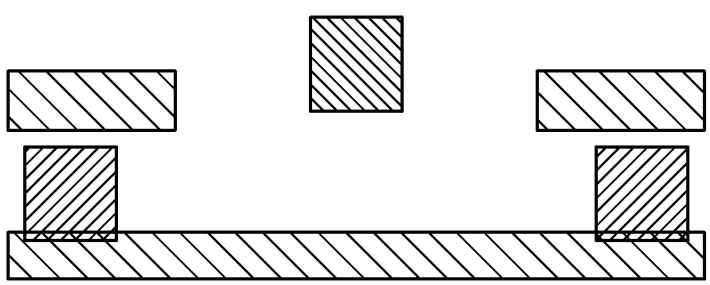

US 9,317,645 B2

METHODS FOR MODIFYING AN INTEGRATED CIRCUIT LAYOUT DESIGN

TECHNICAL FIELD

Embodiments of the present disclosure are directed to photolithographic processing in the design and manufacture of integrated circuits and, in particular, to methods and systems of preparing layout data for the creation of one or more photolithographic masks.

BACKGROUND

In conventional photolithographic processing, integrated circuits are manufactured by exposing a pattern of features that are contained on a mask or reticle onto a wafer. Light passing through the transparent portions of the mask activates light sensitive resist materials on the wafer that are then chemically and mechanically processed to create the circuit features. The process continues building up the integrated circuit, layer by layer.

As circuit features become increasingly small and more densely packed, optical and other process distortions occur such that the pattern of features on the mask does not correspond to how the features will print on the wafer. Therefore, numerous resolution enhancement techniques (RETs) have been developed to improve the ability of the mask to print a desired pattern on the wafer. One resolution enhancement technique is optical and process correction (OPC). OPC operates by changing the mask pattern to pre-compensate for expected optical and process distortions such that a pattern of features printed on a wafer will match a desired target layout pattern. Another resolution enhancement technique is the use of subresolution assist features (SRAFs). Such features are small features placed on a mask or reticle that operate to improve how an adjacent mask feature prints.

It is typically desirable to use an SRAF design strategy that is "as aggressive as possible" improve the imaging quality during photolithography, and further to improve the pattern transfer immunity against photolithography process variations. FIG. 3 illustrates the process window precision of a via printed using fewer/smaller SRAFs (side (a)) as compared to the same via printed using more/larger SRAFs (side (b)). As shown, the process window precision is improved by about 30%. It is further typically desirable to prevent SRAFs from printing. This is because, for some designs, a printing SRAF can be a defect that contributes to random defect generation (especially when a printing SRAF forms a resist line). Multiple stacked printing SRAFs in integrated levels can form an actual electrical path to signals that can alter (and even destroy) the circuit behavior. For example, an SRAF printing might cause unintended electrical paths that can ruin the circuit, as shown in FIG. 4. Thus, the designer of a photomask faces the competing goals of increasing the size and density of SRAFs, while at the same time ensuring that no SRAFs print in such as manner as to result in an unintended electrical path.

Accordingly, it is desirable to provide new techniques and methods for designing photomasks with sub-resolution assist features. Furthermore, other desirable features and characteristics of the present disclosure will become apparent from the subsequent detailed description and the appended claims, taken in conjunction with the accompanying drawings and this background.

BRIEF SUMMARY OF THE INVENTION

Methods for modifying a layout design of an integrated circuit are provided. In one embodiment, a method for modifying an integrated circuit layout design includes providing an initial circuit layout design comprising a lower metal layer, an upper metal layer, and a first via electrically connecting the lower metal layer to the upper metal layer. The method further includes altering the initial circuit layout design by providing a second via, the second via being in electrical contact with no more than one of the upper metal layer and the lower metal layer, and the second via further being in proximity to the first via. Further, the method includes further altering the initial circuit layout design by providing a subresolution assist feature in proximity to the second via.

In another embodiment, a method for modifying an integrated circuit layout design includes providing an initial multiple-patterned circuit layout design comprising a first pattern exposure and a second pattern exposure, modifying the initial multiple-patterned circuit layout design by providing a subresolution assist feature to the first pattern exposure, and determining whether the presence of any overlapping areas between the subresolution assist feature of the first pattern exposure and the second pattern exposure. The method further includes further modifying the initial multiple-patterned circuit layout design by: maintaining the size of any portion of the subresolution assist feature in the overlapping areas, and shrinking the size of any portion of the subresolution assist feature that is not in the overlapping areas.

In yet another embodiment, a system for modifying an integrated circuit layout design includes a display device, a user input device, a storage device, and a processor electronically and communicatively coupled to the display device, the user input device, and the storage device. The processor is configured to provide an initial circuit layout design comprising a lower metal layer, an upper metal layer, and a first via electrically connecting the lower metal layer to the upper metal layer. The processor is further configured to alter the initial circuit layout design by providing a second via, the second via being in electrical contact with no more than one of the upper metal layer and the lower metal layer, the second via further being in proximity to the first via. Still further, the processor is configured to further alter the initial circuit layout design by providing a subresolution assist feature in proximity to the second via.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present invention will hereinafter be described in conjunction with the following drawing figures, wherein like numerals denote like elements, and wherein:

FIGS. 3A and 3B are a simulated lithographic pattern layout illustrating the benefits of the inclusion of SRAFs;

FIGS. 11A, 11B, 12, and 13 illustrate exemplary integrated circuit design in conjunction with an exemplary photolithographic mask configuration in accordance with certain embodiments of the present disclosure;

DETAILED DESCRIPTION

The following detailed description is merely exemplary in nature and is not intended to limit the embodiments set forth herein or the application and uses of the embodiments. Furthermore, there is no intention to be bound by any theory presented in the preceding background or the following detailed description.

Embodiments of the present disclosure are broadly directed to the design fabrication of integrated circuits, and more particularly to the design of photolithographic masks in the design and fabrication of integrated circuits. Embodiments of the present disclosure utilize prior learning from process and model simulations to extrapolate dense two-dimensional pitch patterns (especially at the edge of the array) that have a reasonable process window (PW) performance with regard to precision and accuracy in printing a target feature. This information may be used to create a pitch transformation from a lithographically "weak" pitch into a litho "friendly" pitch. As used herein, the term pitch transformation refers to the printing of extra ("dummy") contacts or vias such that the overall lithographic design has improved PW precision when printed. The embodiments described herein ensure that the extra printed contacts/vias never coincide with the metal layer above or below, which, as noted above, could result in an undesirable device performance, for example, the formation of false electrical connections. This approach creates homogeneity in the pattern density and diffraction orders and noticeably improves the PW. Again, as set forth in greater detail herein, the pitch transforming "dummy" contact/vias are never allowed to coincide with metal layers above or below the printed layer. Pitch transforming dummy contact/vias are then treated exactly the same as regular OPC structures, where they will receive SRAFs and further be subjected to OPC.

The execution of the various exemplary mask design processes disclosed herein may be implemented using computer-executable software instructions executed by one or more programmable computing devices. Because these exemplary embodiments may be implemented using software instructions, the components and operation of a generic programmable computer system on which various embodiments may be employed will first be described. Further, because of the complexity of some mask design processes and the large size of many circuit designs, various electronic design tools are configured to operate on a computing system capable of simultaneously running multiple processing threads. The components and operation of a computer network having a host or master computer and one or more remote or slave computers therefore will be described with reference to FIG. 1. This operating environment is only one example of a suitable operating environment, however, and is not intended to suggest any limitation as to the scope of use or functionality of the described embodiments.

Figure 1:
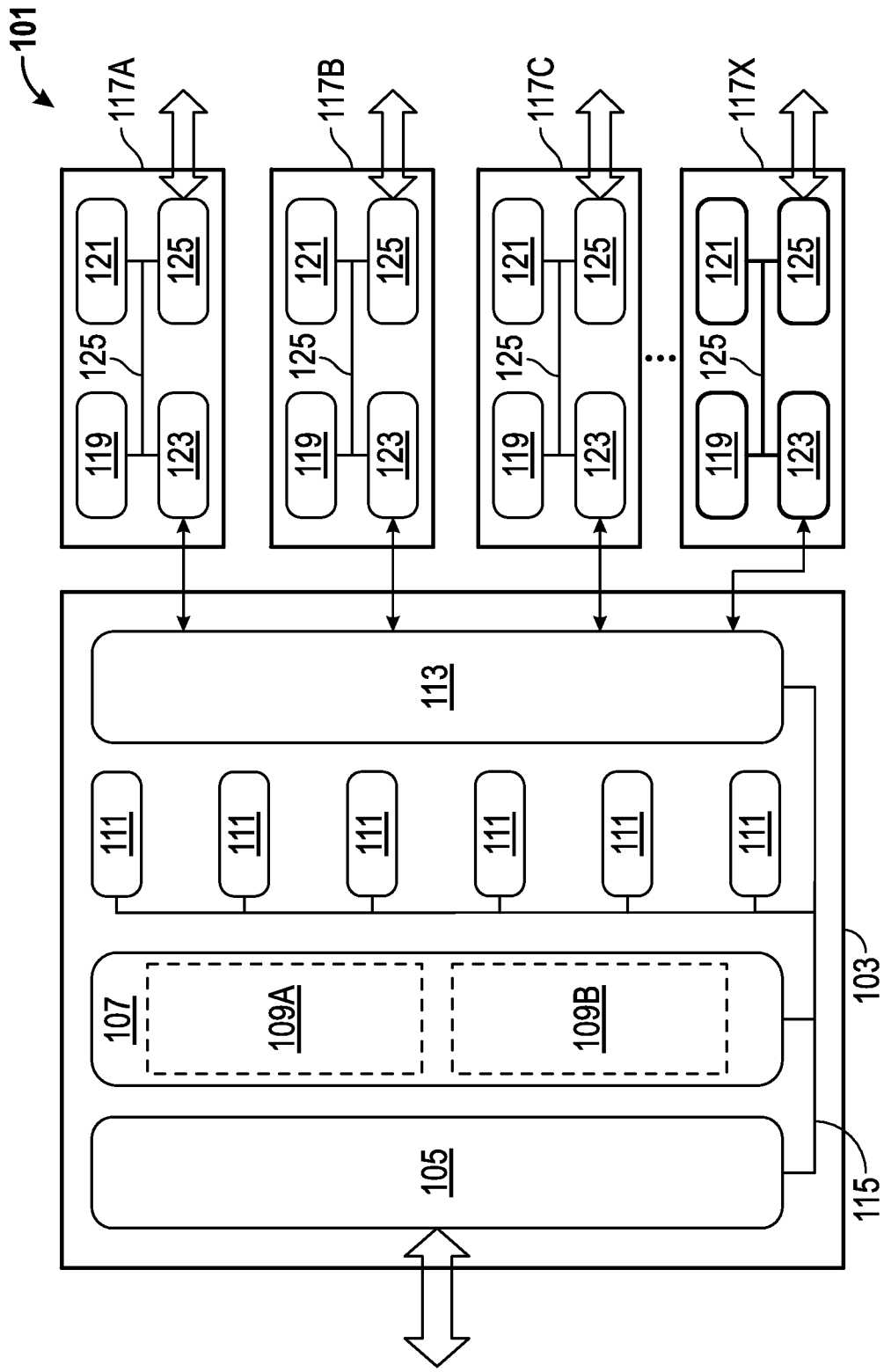
FIG. 1 illustrates an exemplary computing system that may be used to implement various embodiments of the invention.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, non-transitory media such as microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more mask design operations according to various exemplary embodiments. Accordingly, the memory 107 stores software instructions 109A that, when executed, will implement a software application for performing one or more such operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
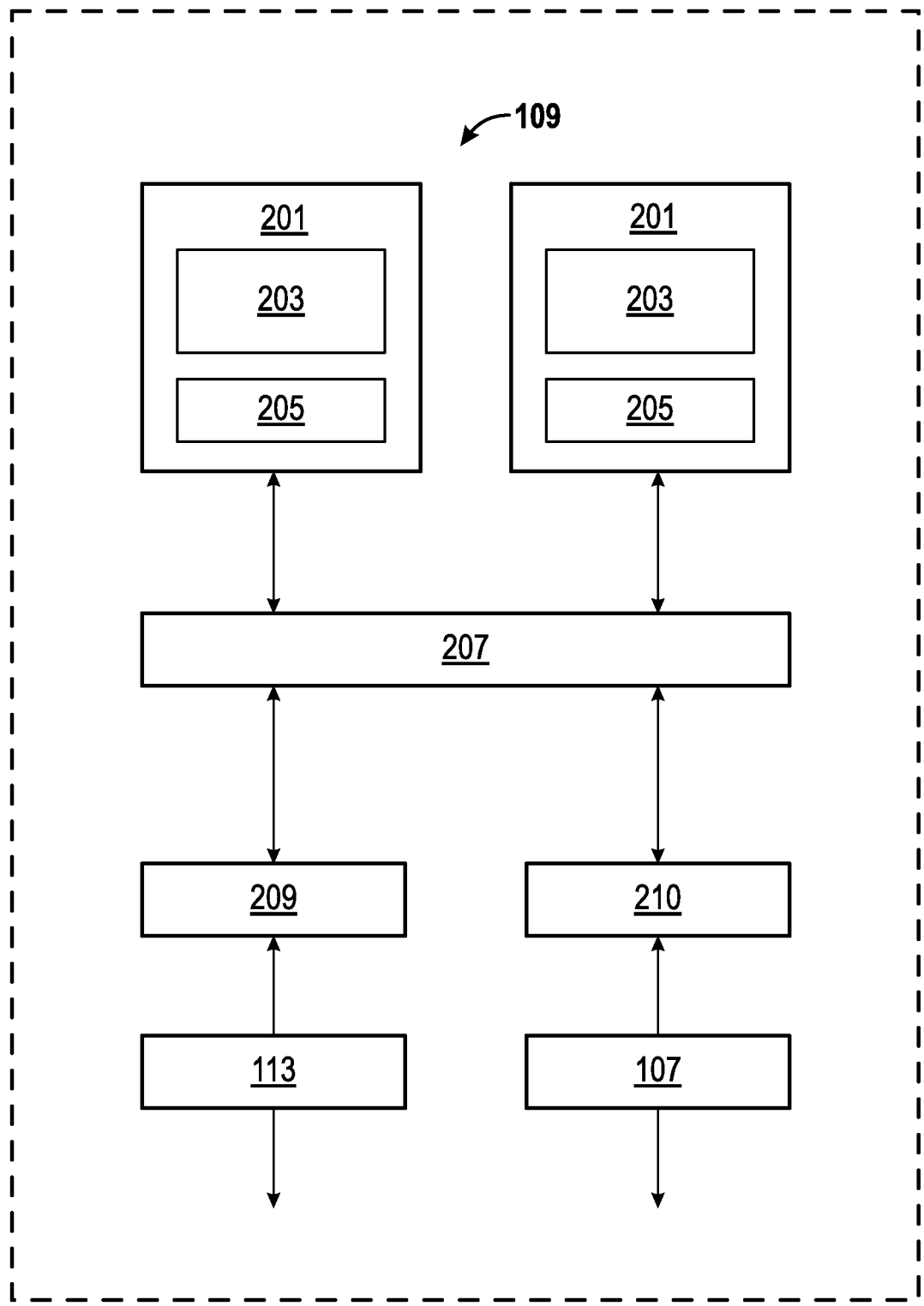
FIG. 2 illustrates an exemplary multi-core processor unit associated with the computing system shown in FIG. 1 that may be used to implement various embodiments of the invention.
Figure 4:
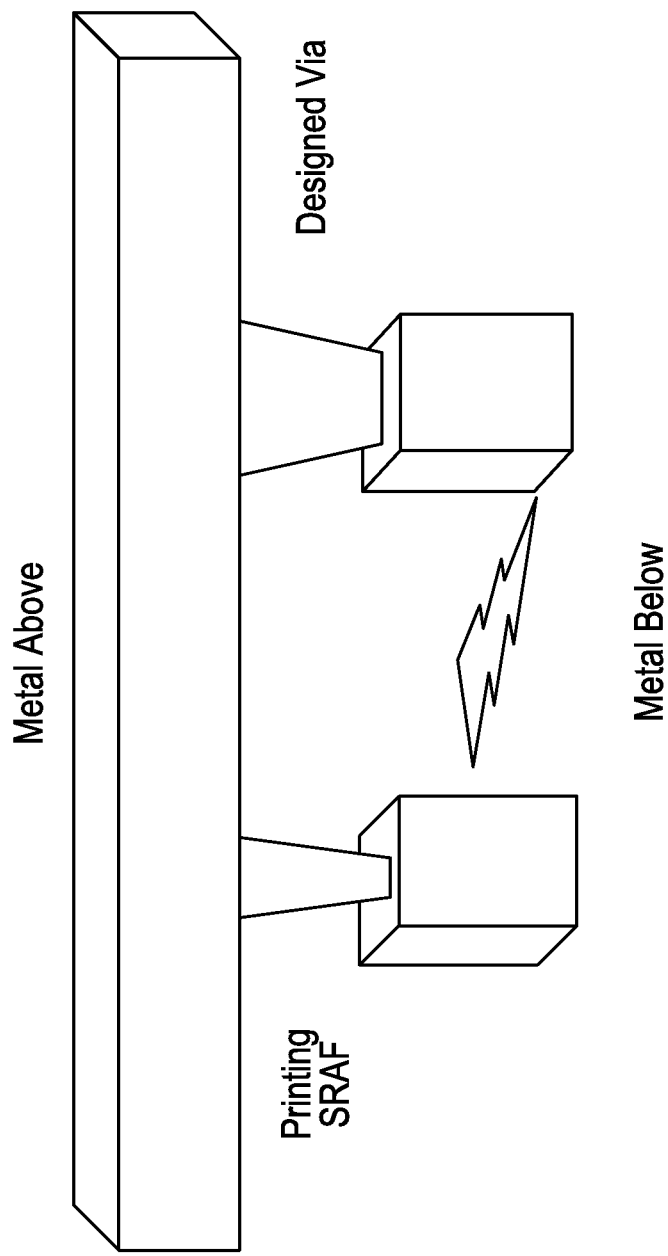
FIG. 4 is an illustration illustrating the problem of unintended electrical connections in the printing of SRAFs.

In some embodiments, the master computing device 103 may employ one or more processing units 111 having more than one processor core. Accordingly, FIG. 2 illustrates an example of a multi-core processor unit 111 that may be employed with various embodiments. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR, and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. The processor cores 201 communicate through the interconnect 207 with an input/output interfaces 209 and a memory controller 211. The input/output interface 209 provides a communication interface between the processor unit 201 and the bus 115. Similarly, the memory controller 211 controls the exchange of information between the processor unit 201 and the system memory 107. In some embodiments, the processor units 201 may include additional components, such as a high-level cache memory accessible shared by the processor cores 201.

While FIG. 2 shows one illustration of a processor unit 201 that may be employed by some embodiments, it should be appreciated that this illustration is representative only, and is not intended to be limiting. For example, some embodiments may employ a master computer 103 with one or more cell processors. The cell processor employs multiple input/output interfaces 209 and multiple memory controllers 211. Also, the cell processor has nine different processor cores 201 of different types. More particularly, it has six or more synergistic processor elements (SPEs) and a power processor element (PPE). Each synergistic processor element has a vector-type computing engine 203 with 128×128 bit registers, four single-precision floating point computational units, four integer computational units, and a 256 KB local store memory that stores both instructions and data. The power processor element then controls that tasks performed by the synergistic processor elements. Because of its configuration, the cell processor can perform some mathematical operations, such as the calculation of fast Fourier transforms (FFTs), at substantially higher speeds than many conventional processors.

It also should be appreciated that, with some implementations, a multi-core processor unit 111 can be used in lieu of multiple, separate processor units 111. For example, rather than employing six separate processor units 111, an alternate implementation may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the slave computers 117A, 117B, 117C . . . 117X through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the slave computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each slave computer 117 may include a memory 119, a processor unit 121, an interface device 122, and, optionally, one more input/output devices 125 connected together by a system bus 127. As with the master computer 103, the optional input/output devices 125 for the slave computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the invention, one or more of the processor units 121 may be a cell processor. The memory 119 then may be implemented using any combination of the computer readable media discussed above. Like the interface device 113, the interface devices 123 allow the slave computers 117 to communicate with the master computer 103 over the communication interface.

In the illustrated example, the master computer 103 is a multi-processor unit computer with multiple processor units 111, while each slave computer 117 has a single processor unit 121. It should be noted, however, that alternate embodiments may employ a master computer having single processor unit 111. Further, one or more of the slave computers 117 may have multiple processor units 121, depending upon their intended use, as previously discussed. Also, while only a single interface device 113 or 123 is illustrated for both the master computer 103 and the slave computers, it should be noted that, with alternate embodiments, either the computer 103, one or more of the slave computers 117, or some combination of both may use two or more different interface devices 113 or 123 for communicating over multiple communication interfaces.

In some embodiments, the master computer 103 may be connected to one or more external data storage devices. These external data storage devices may be implemented using any combination of computer readable media that can be accessed by the master computer 103. The computer readable media may include, for example, non-transitory microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations, one or more of the slave computers 117 may alternately or additionally be connected to one or more external data storage devices. Typically, these external data storage devices will include data storage devices that also are connected to the master computer 103, but they also may be different from any data storage devices accessible by the master computer 103.

Computer network 101 may be employed to generate a lithographic mask design for process yield improvement as will be described in greater detail below.

Figure 5:
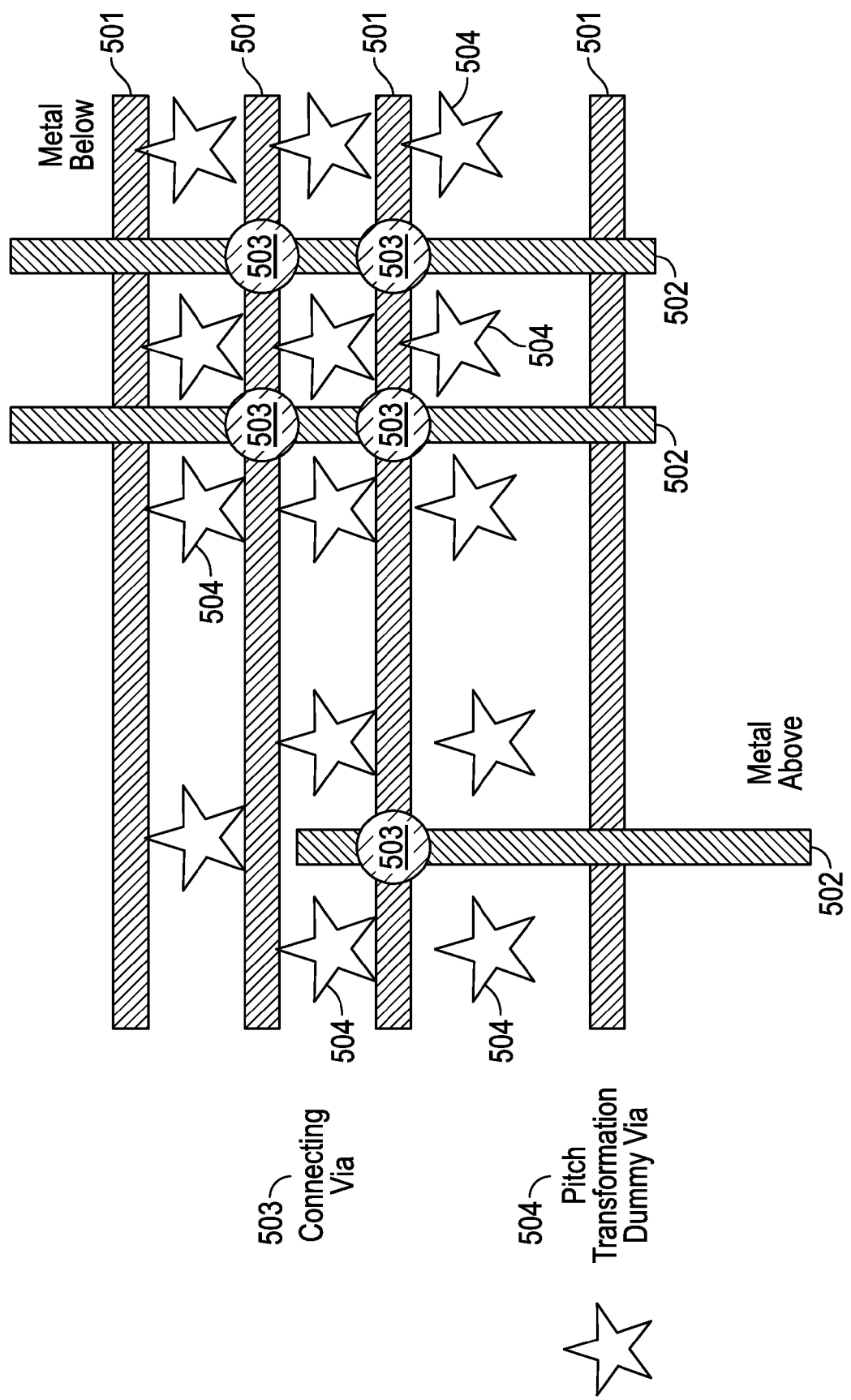
FIGS. 5 and 6 illustrate exemplary integrated circuit designs in conjunction with an exemplary photolithographic mask configuration in accordance with certain embodiments of the present disclosure.

FIG. 5. Illustrates an integrated circuit layout design including a plurality of pitch transforming "dummy" vias. As shown therein, two metal layers 501 and 502 are provided, with layer 502 being provided above layer 501. The layout design requires a plurality of vias 503 to connect the metal layers 501 and 502. In order to improve the process window of the layout design when printed, FIG. 5 illustrates that a plurality of "dummy" vias 504 are printed in proximity to the "true" vias 503. Importantly, the extra dummy vias 504 are allowed to print only in the regions where both metal layer 501 and metal layer 502 are not present. Thus, this embodiment represents a "conservative" approach to ensure that no false electrical connections are created by the presence of the dummy vias 504.

Figure 6:
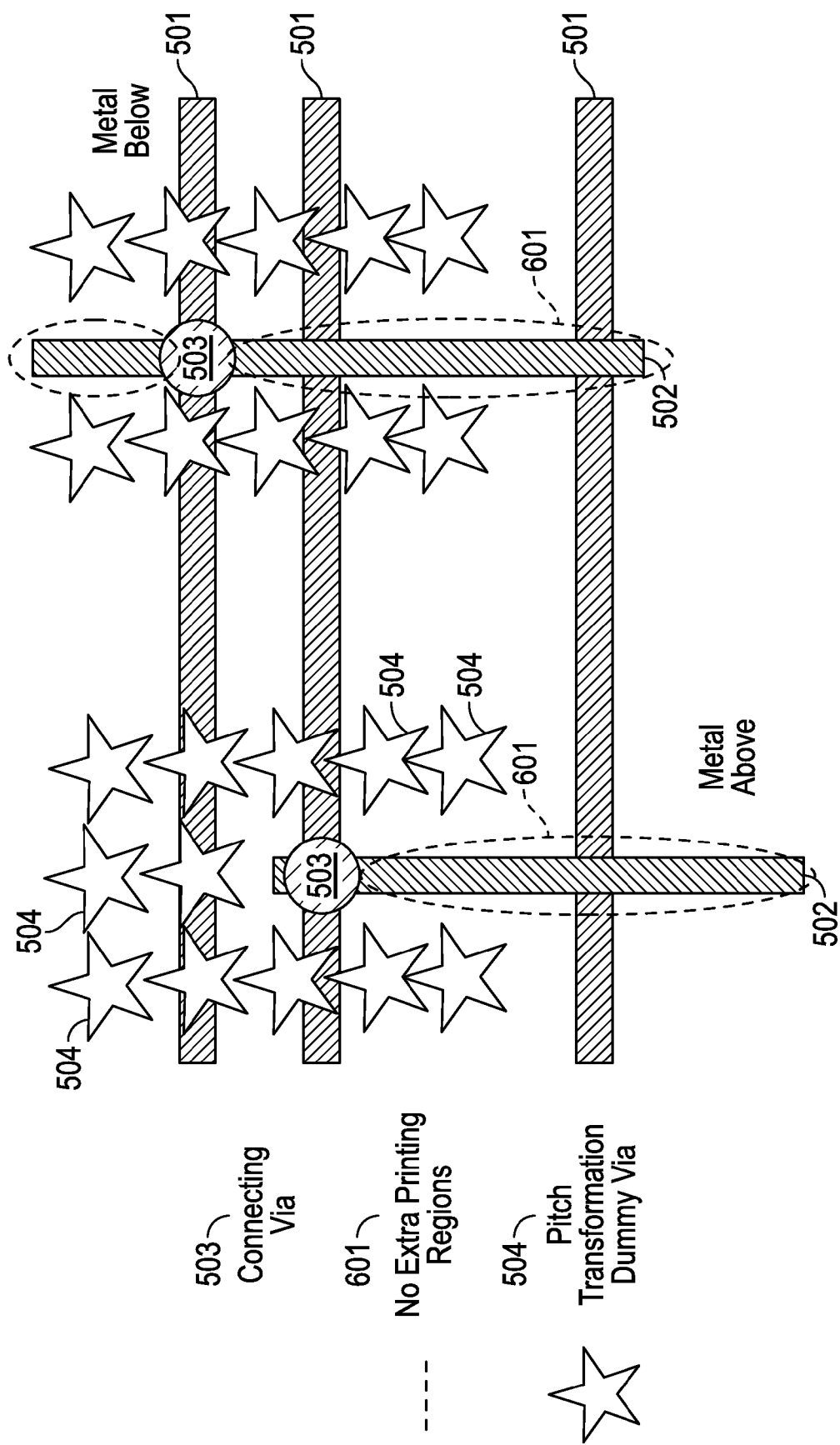

FIG. 6 represents a further embodiment of an integrated circuit layout design including a plurality of pitch transforming dummy vias. As shown therein, resolution is enhanced by printing the dummy vias 504 in regions where both metal layer 501 and metal layer 502 are not present, in addition to areas where only lower metal layer 501 is present. No dummy vias are printed in regions 601 where only the upper metal layer 502 is present. Thus, this embodiment represents another conservative approach to ensure that no false electrical connections are created by the presence of the dummy vias 504. This embodiment is particularly useful in the context of a self-aligned via (SAV) process flow.

Figure 7:
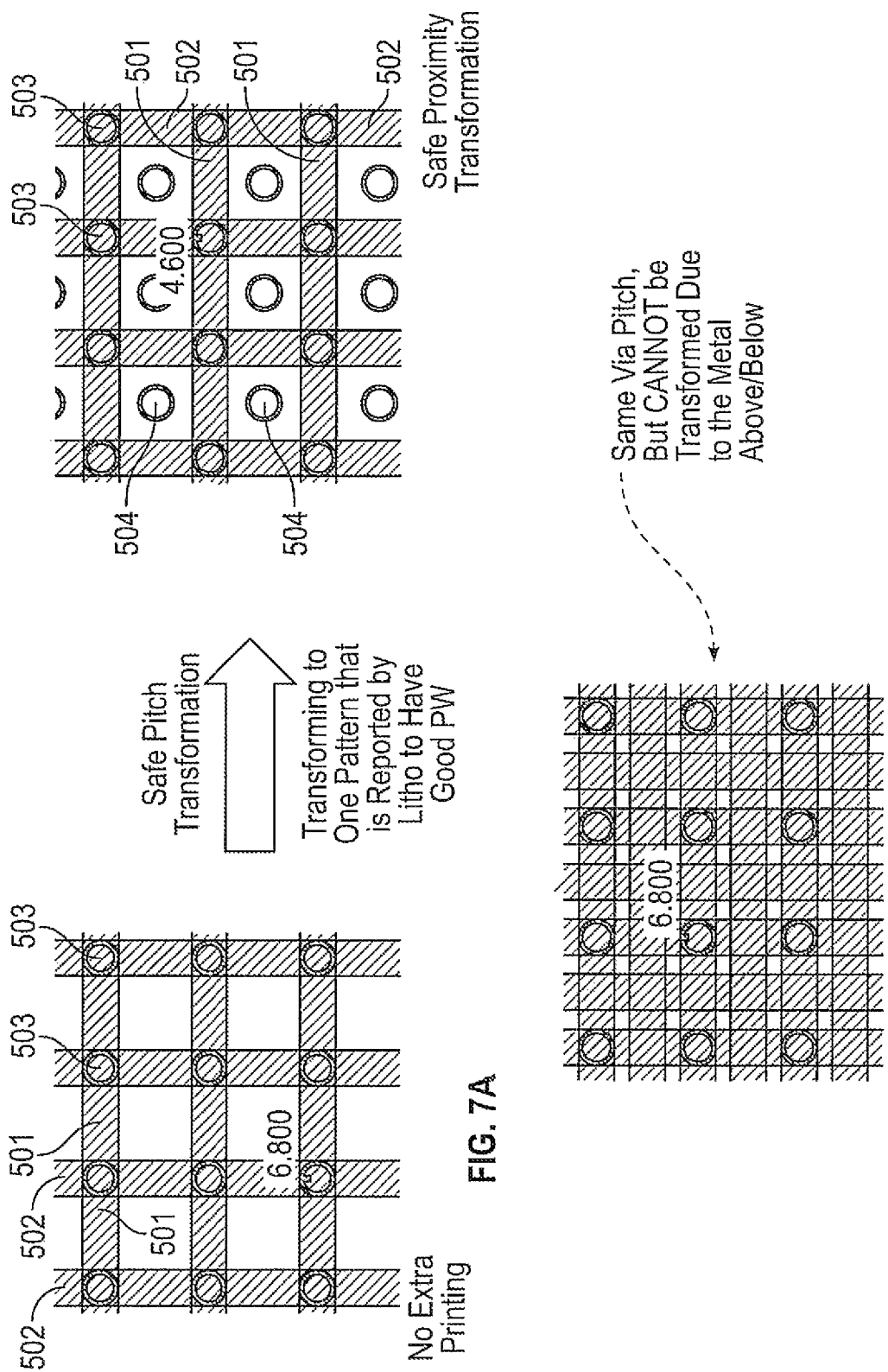
FIGS. 7A, 7B, and 8 illustrate certain benefits associated with an integrated circuit design prepared in accordance with the configurations shown in FIGS. 5 and 6.
Figure 8:
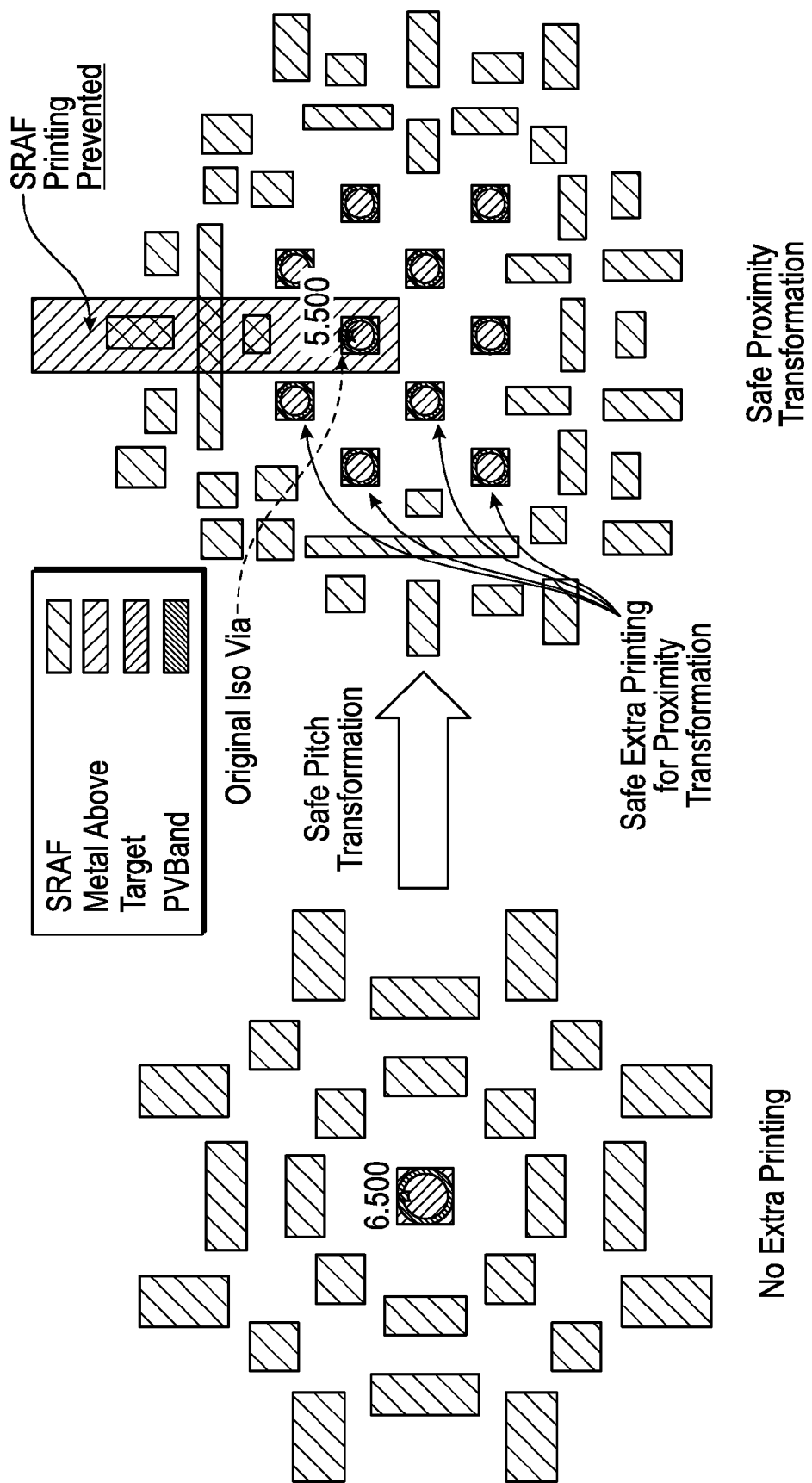

FIG. 7 is another exemplary layout design provided to illustrate the benefits of printing pitch transforming dummy vias 504. Between layout (a1), which does not include the dummy vias 504, and layout (a2), which includes dummy vias 504 in regions where both metal layers 501 and 502 are not present, it is shown that the printing accuracy of the true vias 503 is improved by over 40%. Further illustrated in FIG. 7, layout (b) is a design that cannot be transformed by the printing of dummy vias, as there are no available regions to print the dummy vias that will ensure that no false electrical connections are formed. FIG. 8 further illustrates the benefits of the inclusion of dummy vias, in the context of a pattern printed with only the aide of SRAFs versus a pattern printed with SRAFs and the dummy vias described above. Here, the benefit is about 20% improved accuracy, as shown.

Figure 9:
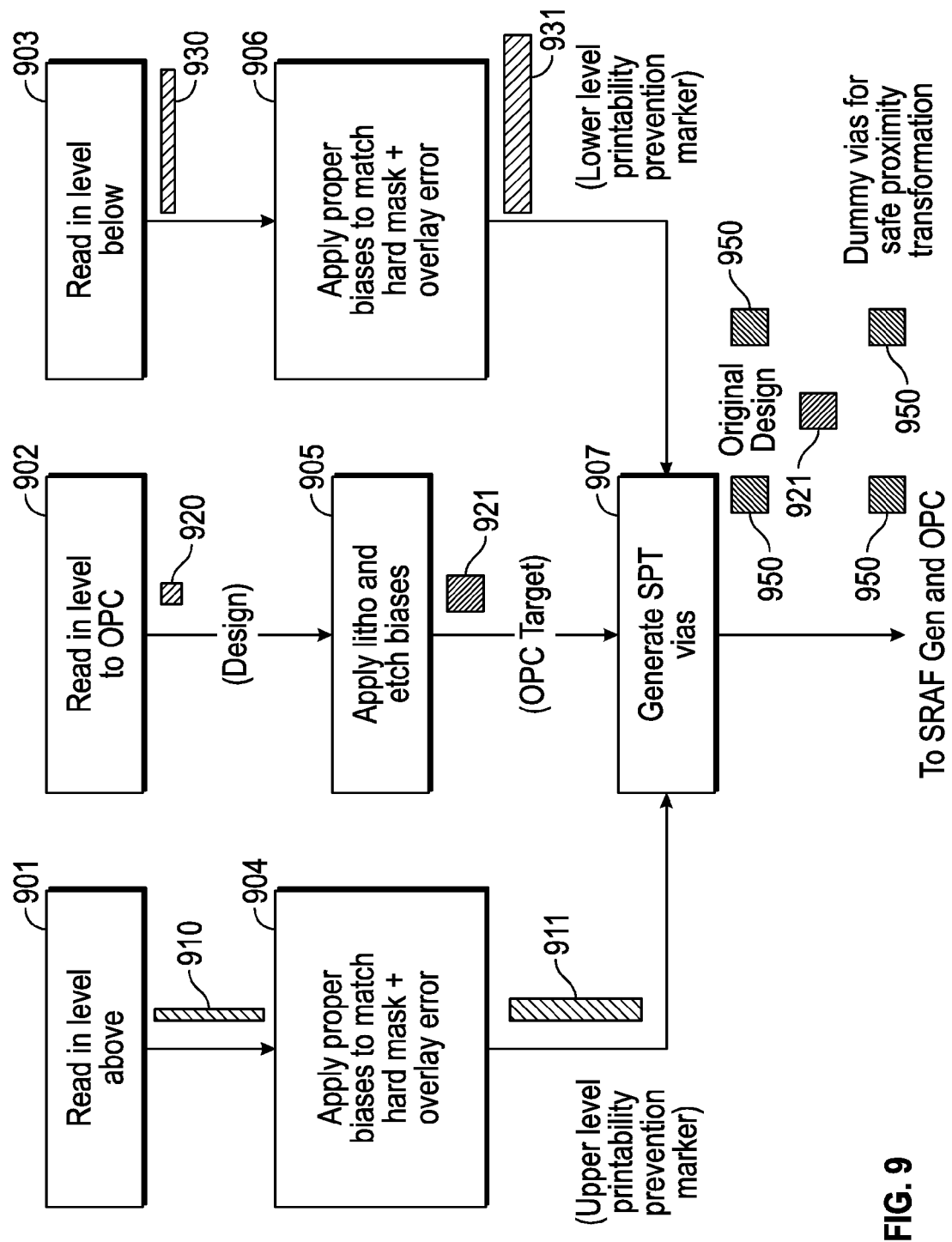
FIGS. 9 and 10 illustrate exemplary methods for providing a lithographic layout design in accordance with certain embodiments of the present disclosure.

A method for generating a layout design in accordance with the present disclosure is provided in FIG. 9, along with illustrative layout features at each step in the method. The method begins with steps 901, 902, and 903, where the configuration for each layer of the design is provided to the pitch transforming system. As shown at step 901, the initial configuration for the upper metal layer 910 is provided; as shown at step 902, the initial configuration for the via 920 is provided, and as shown at step 903, the initial configuration for the lower metal layer 930 is provided. At steps 904, 905, and 906, the appropriate biases and errors are applied to each layer 910, 920, and 930, to generate a corrected upper metal layer 911, a corrected via 921, and a corrected lower metal layer 931. With the layers of the design being now provided and corrected for biases and errors, safe pitch transforming vias 950 may be added, at step 907, in the regions where neither layers 911 nor 931 are present to transform the pitch and improve the accuracy of the true via 921.

Figure 10:
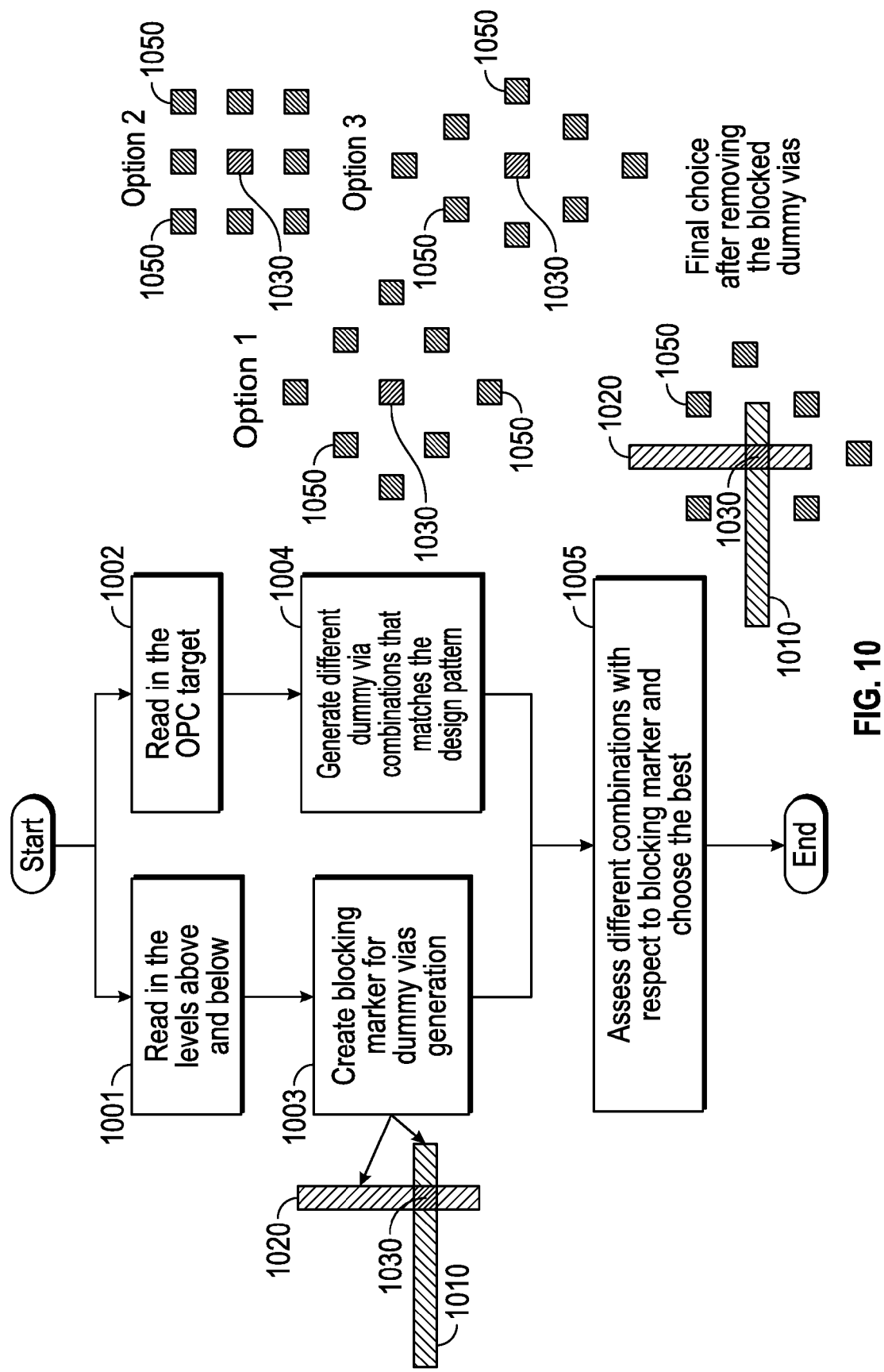

An alternative method for generating a layout design in accordance with the present disclosure is provided in FIG. 10, along with illustrative layout features at each step in the method. The method begins with steps 1001 and 1002, as in FIG. 9, with providing an initial configuration for the upper metal layer (1010), lower metal layer (1020), and vias (1030). In this method, the upper metal layer 1010 and the lower metal layer 1020 serve as "blocking markers" for determining areas where dummy vias should not be provided, as shown in connection with step 1003. Thereafter, at step 1004, based on the pattern of vias (1030), various dummy via combinations (1050) are provided that match the design pattern. Various exemplary options 1 through 3 are provided in FIG. 10. Thereafter, the blocking markers are compared against the exemplary dummy via combinations, and dummy vias 1050 that would print over the blocking markers 1010, 1020 are removed, as shown in step 1005, to generate a final design layout.

As such, the presently described method redesigns the proximity around the contact/vias into a more lithography friendly pitch pattern (where the diffraction pattern better matches with the used illumination). The re-design methodology is based on three basic steps after the identification of non-friendly pitches: identifying the possible pitches that the current pitch can transform into; identifying the safe regions for the printing assisting features based on the metals above and below; and re-designing the proximity based on the safest and most PW improving surrounding proximity. The decision is based on PW improvement and the prevention of making any false circuit connections, as well as any reliability issues that can appear.

Figure 11:
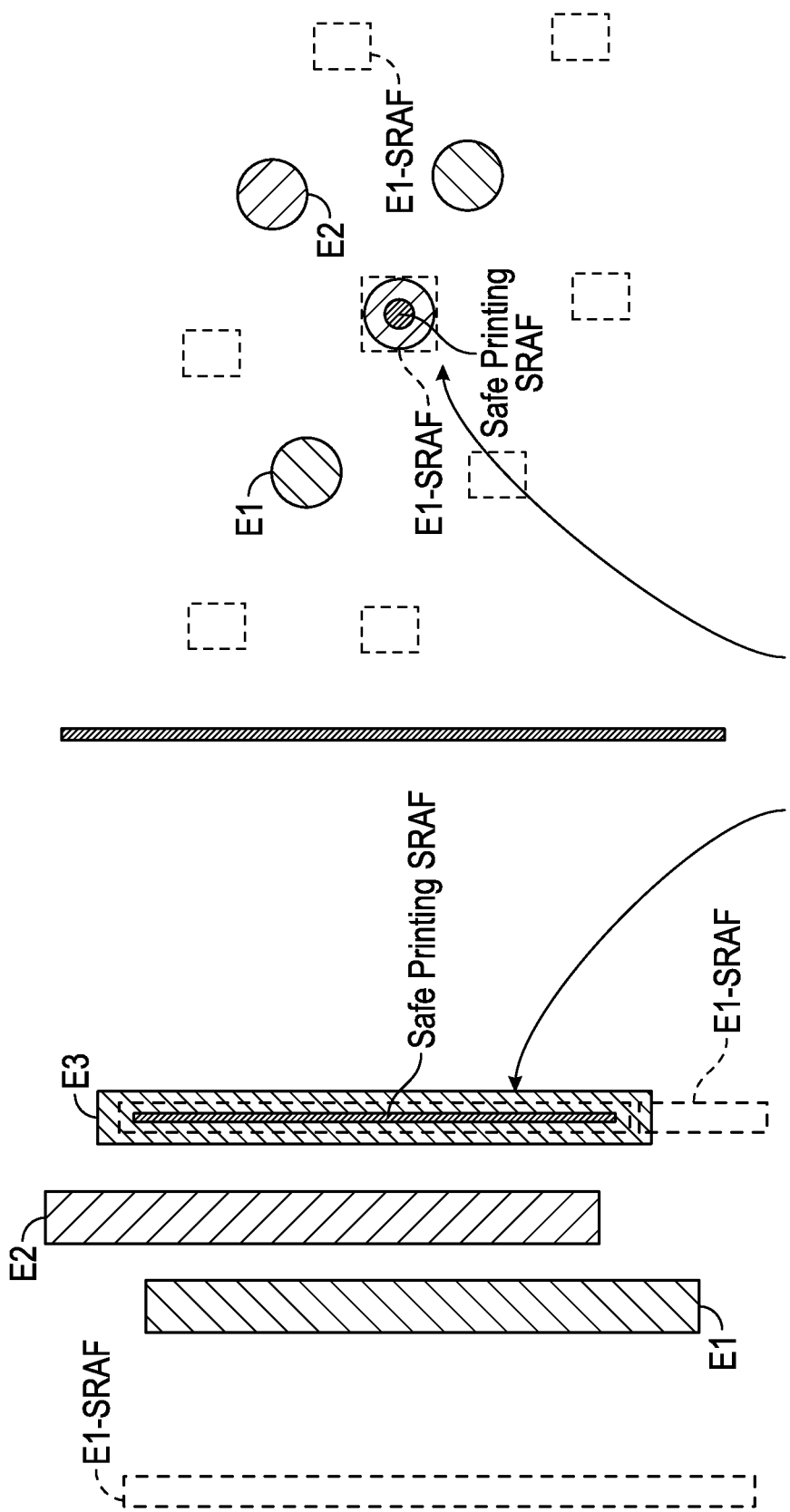

A further embodiment of the present disclosure is now provided in connection with FIG. 11 et seq. As shown therein, pitch transforming methodologies can be applied to double- or multiple-patterning lithography technologies. In double/multiple-patterning technologies, the generated SRAFs of each of the exposures are totally independent from the other exposures. This means that technically the solution of each exposure during the OPC flow is almost as if it is a single exposure mask. In many situations, some of the SRAFs of one of the exposures may coincide with one or more of the main patterns of the second exposure, which technically means that there will be no reliability problem if these SRAFs completely print (as long as their printing is bounded by the other exposure critical dimensions (CD)). The presently described embodiment this concept to improve the PW performance during optical lithography by allowing printing SRAFs that are bounded by the other exposure(s) CD.

Figure 13:
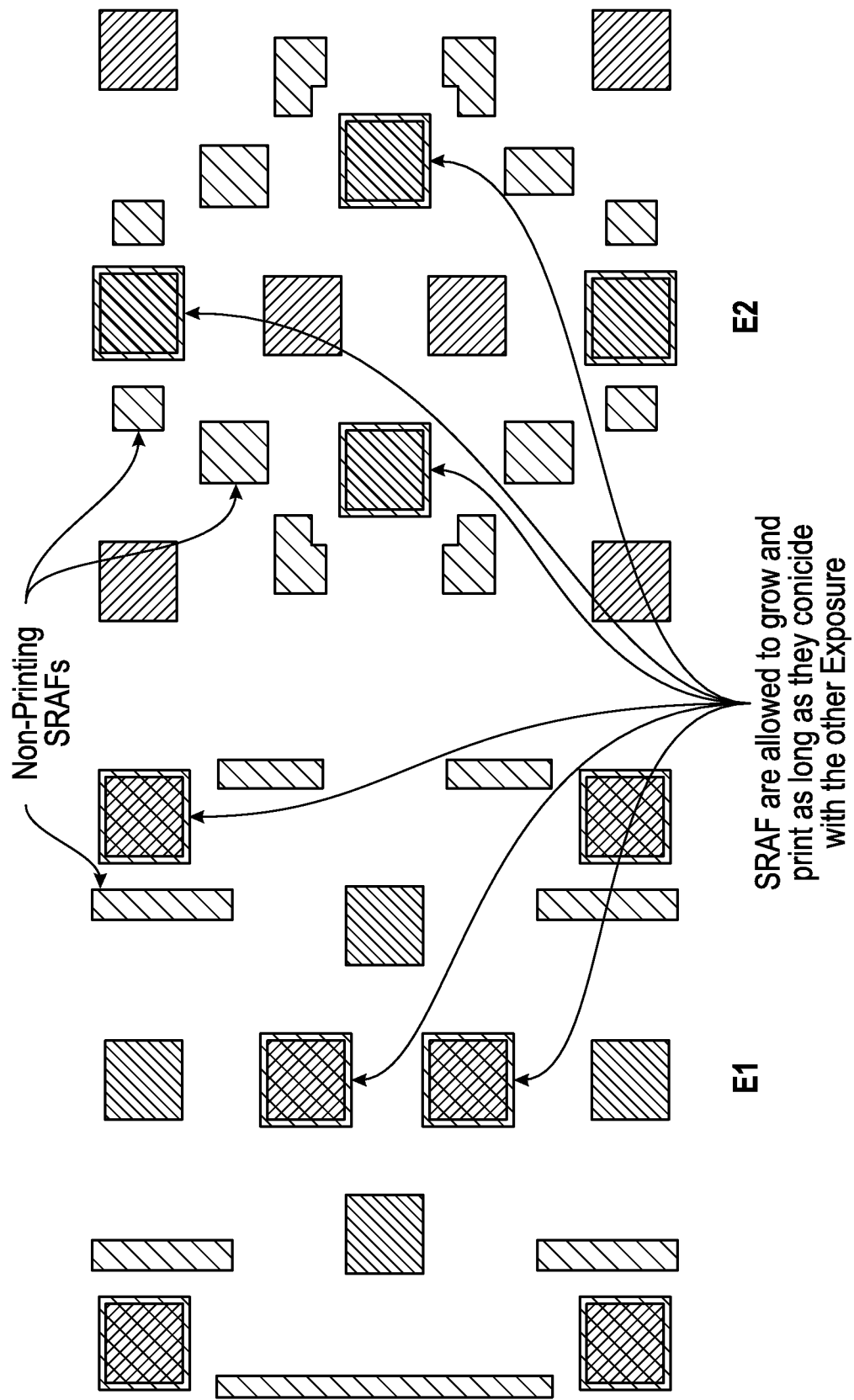
Figure 14:
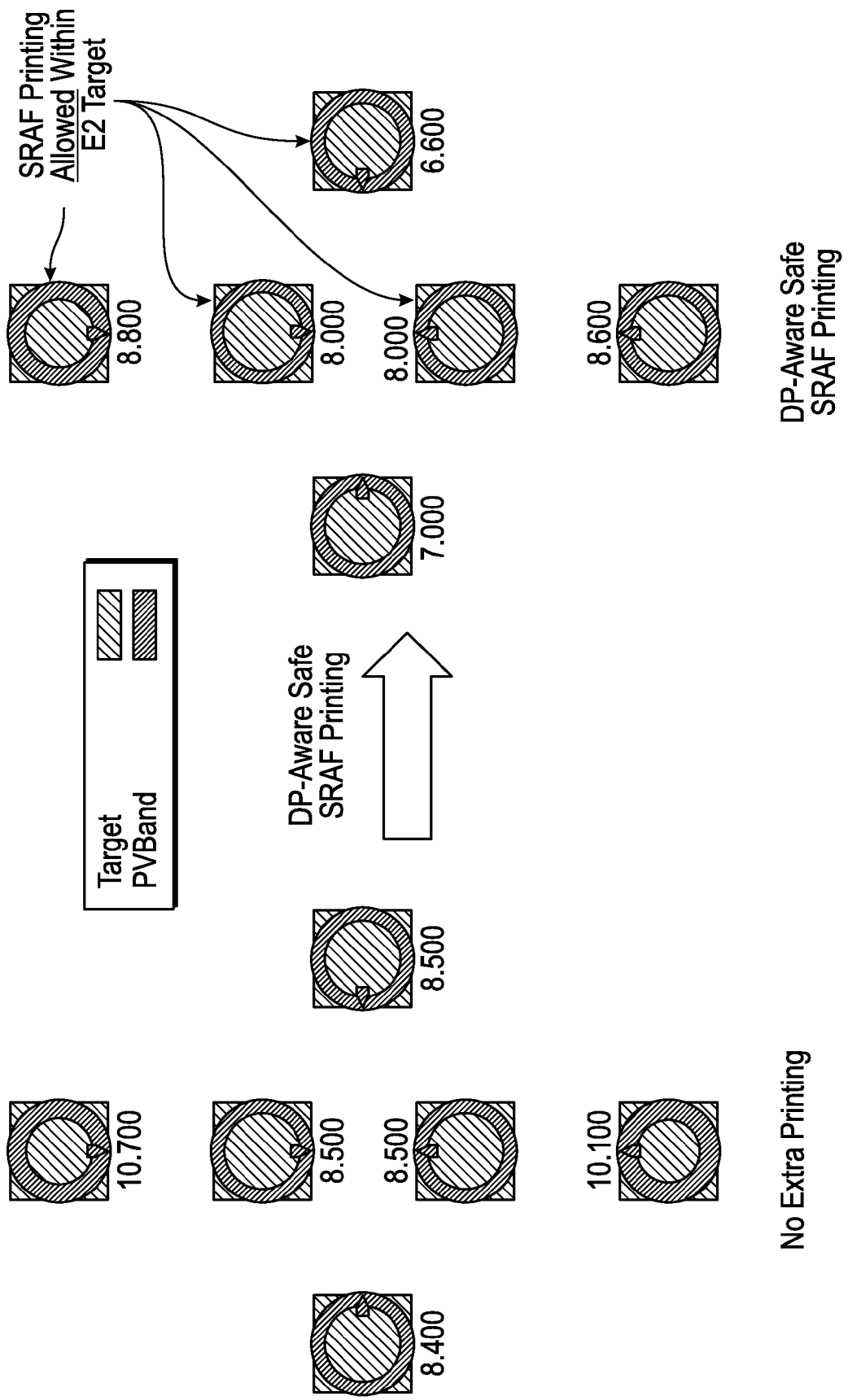
FIG. 14 illustrates certain benefits associated with an integrated circuit design prepared in accordance with the configuration shown in FIGS. 11, 12, and 13.
Figure 15:
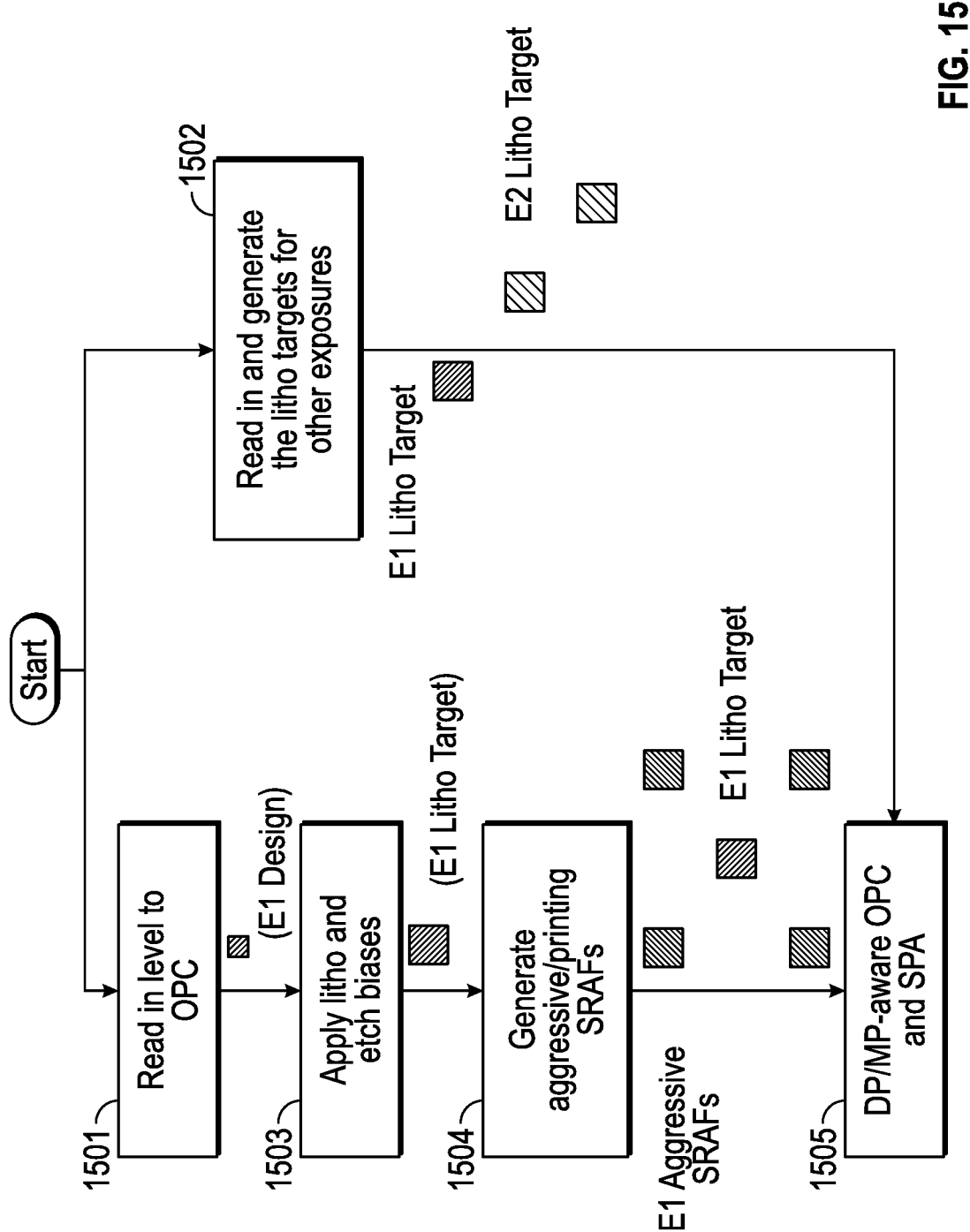
FIGS. 15-18 illustrate exemplary methods for providing a lithographic layout design in accordance with certain embodiments of the present disclosure.

Referring now particularly to FIG. 11, part (a) illustrates a layout design for triple-patterned metal layer printing exposures (E1, E2, and E3), and part (b) illustrates a layout design for a double-patterned via/contact printing exposures (E1 and E2). In each case, pattern E1 includes an SRAF feature that overlaps the metal layer/via design of another pattern. Thus, FIG. 11 shows that SRAFs bounded by other exposures of the same level are allowed to be larger and print as they have no risk on the final design even if they transfer through the etch because the align with the original design. Likewise, FIGS. 12 and 13 illustrate an exemplary layout design having two exposures E1 and E2. FIG. 12 shows the original designs, whereas FIG. 13 shows the modified design after the overlapping SRAFs are allowed to grow and print where they coincide with the other exposure. The non-printing (non-overlapping) SRAFs, as shown, are not allowed to print. Furthermore, FIG. 14 shows the benefit in accuracy of printing achieved by allowing the extra printing of SRAFs in overlapping regions between exposures.

A method for generating a layout design in accordance with the present disclosure is provided in FIG. 9, along with illustrative layout features at each step in the method. The method begins with steps 1501 and 1502, which include providing the layout design for the various exposures in a double- or multiple-level patterning layout, including for example E1 and E2 targets, as shown. Lithography and etch biases are applied at step 1503 to account for any printing errors, and an SRAF pattern is provided around the target E1 at step 1504. Finally, at step 1505, the layouts from each exposure are combined, and overlapping SRAFs are allowed to print, whereas non-overlapping SRAFs are not.

Figure 16:
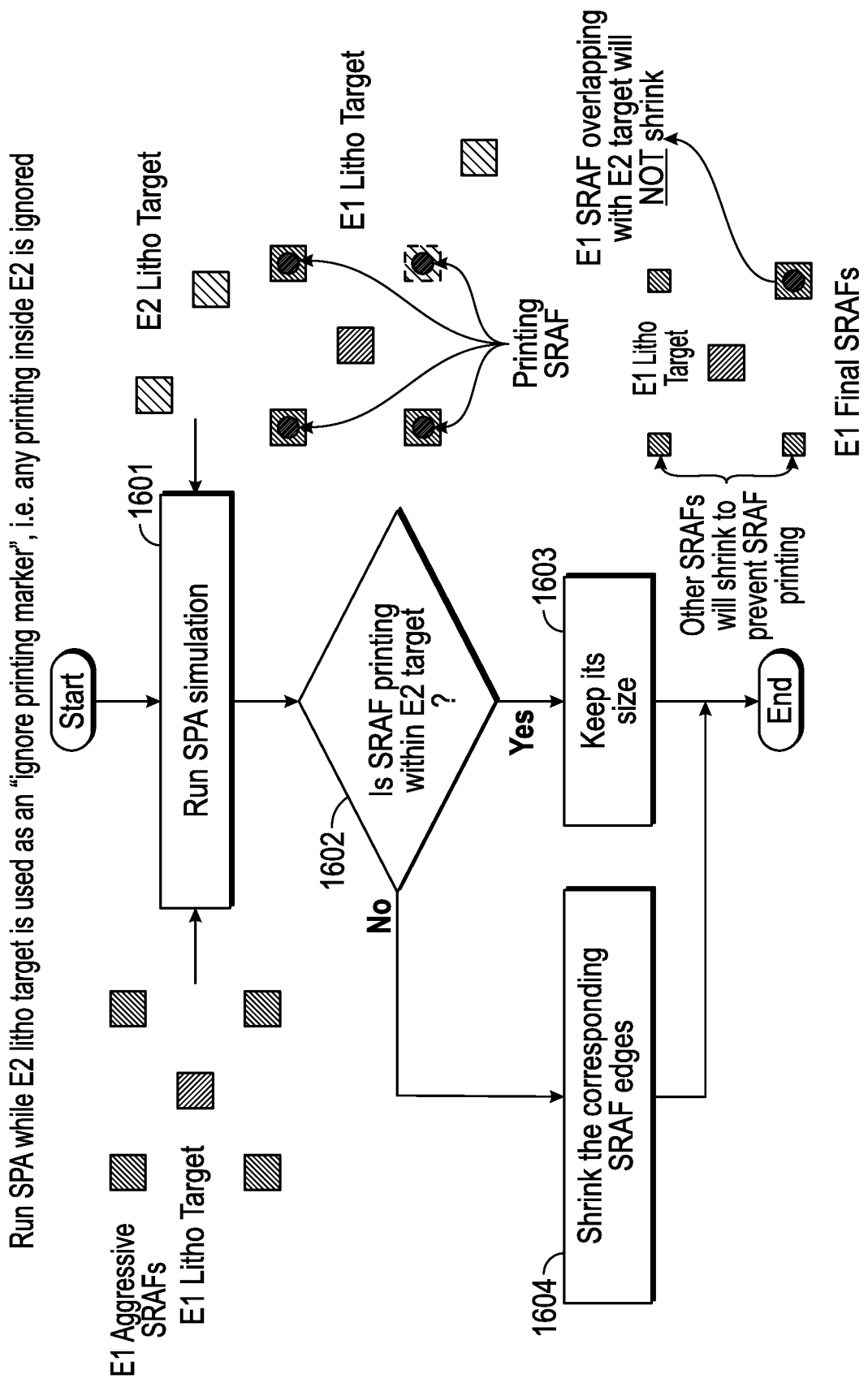

Various alternatives exist for performing step 1505. Three exemplary embodiments are provided herein in FIGS. 16, 17, and 18, respectively. Turning first to the exemplary embodiment shown in FIG. 16, step 1505 may be performed by comparing the various E1, E2, etc. exposure layouts in a SRAF print avoidance (SPA) simulation. The simulation determines, at step 1602, whether, for example, the E1 SRAFs are within the E2 target area, as shown. If yes, the SRAF is retained at its original design size, as shown at step 1603. If, however, as shown at step 1604, the E1 SRAF is not within an E2 target, the SRAF size is shrunk to prevent printing thereof. In this manner, the SPA simulation is run while using the E2 lithography targets as "ignore printing markers" such the print avoidance simulation ignores the SRAFs therewithin.

Figure 17:
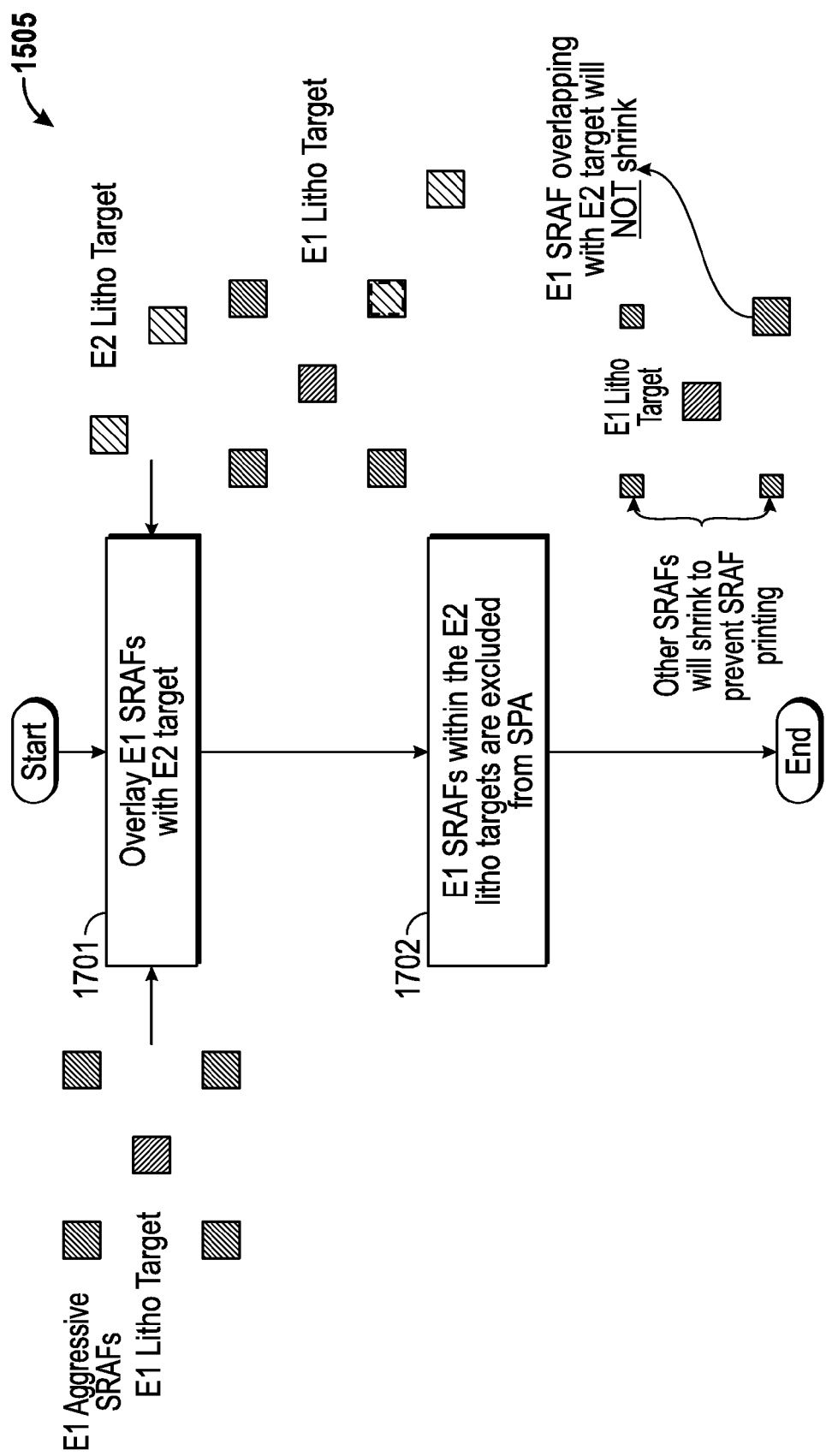

Turning now to the second exemplary embodiment shown in FIG. 17, step 1505 may be performed by merely overlaying the E1 (for example) SRAFs over the E2 target areas, as shown at step 1701. Thereafter, at step 1702, any E1 SRAFs found to be within the E2 lithography targets are excluded from the SPA simulation. The result is that non-overlapping E1 SRAFs will shrink to prevent printing, and those overlapping with an E2 target will not shrink, as shown in FIG. 17. In this manner, the SPA simulation is run while the E2 lithography targets are used to identify E1 SRAF edges that will not be considered for SPA correction.

Figure 18:
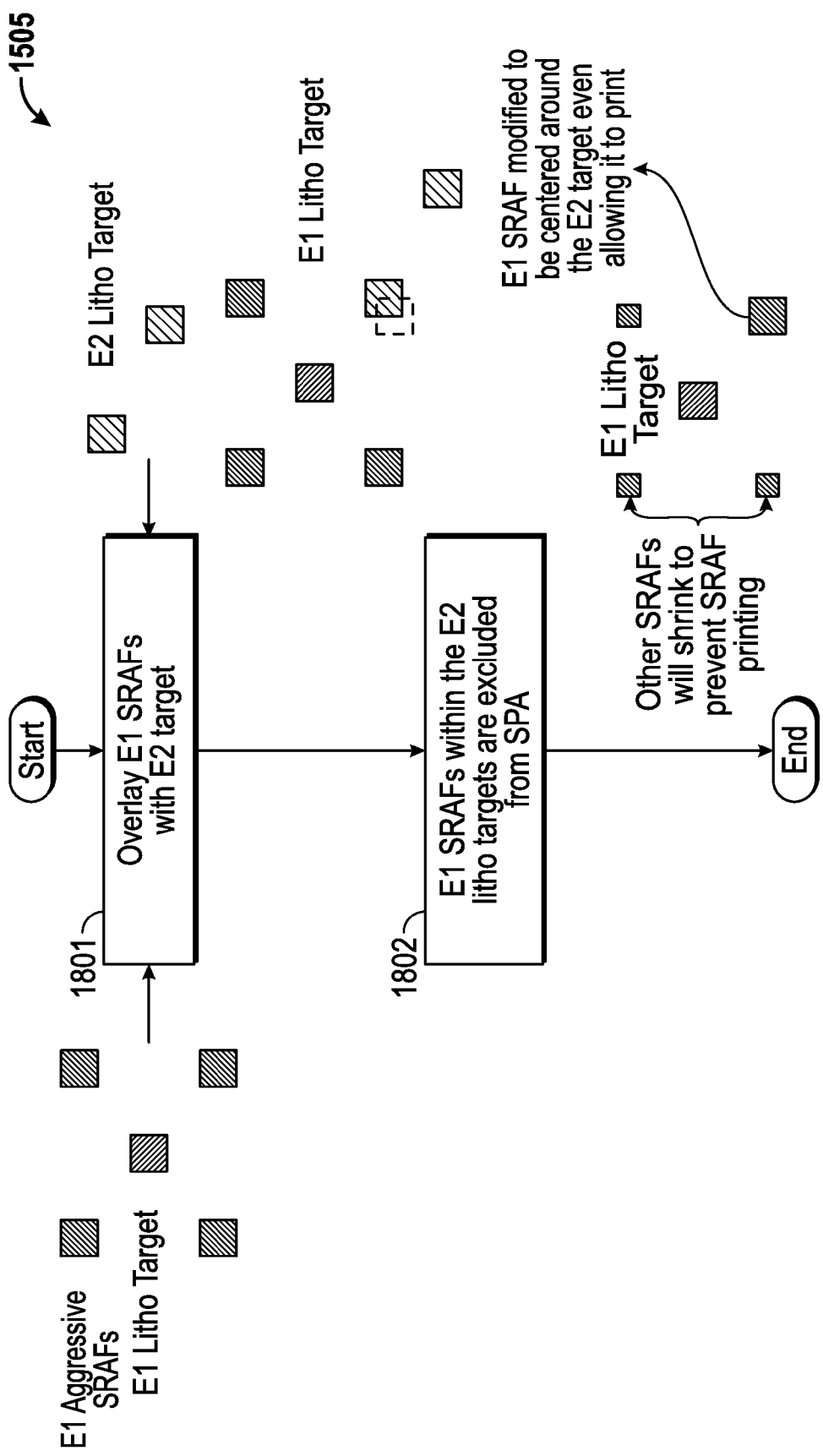

Turning now to the third exemplary embodiment shown in FIG. 18, step 1505 may be performed as indicated above with regard to FIG. 17 (steps 1801 and 1802 corresponding to 1701 and 1702, respectively) except that this method employs shape manipulation, as shown, to slightly modify the E1 SRAF configuration to overlay with the E2 target areas. IF SRAFs can be slightly modified to align with other exposure targets such that replacing the SRAF with a modified version thereof, the PW window will be improved.

As such, the presently described embodiment provides a method wherein SRAFs can be slightly altered into much more "aggressive" SRAFs to allow better PW as long as they are printing within the other exposure targets in the context of a multiple pattern layout. Three techniques are provided to achieve this benefit: using aggressive SRAFs and ignoring printing within the other exposure's target during SPA; using aggressive SRAFs and using the other exposure's target to identify SRAF edges that will not be considered during SPA; and generating aggressive SRAFs then altering them to align and resize around the other exposure's target.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the disclosure as set forth in the appended claims and their legal equivalents.

What is claimed is:

1. A method for modifying an integrated circuit layout design, the method comprising:
providing an initial circuit layout design comprising a lower metal layer, an upper metal layer, and a first via electrically connecting the lower metal layer to the upper metal layer;
altering, by using a computer, the initial circuit layout design by providing a second via, the second via being in electrical contact with no more than one of the upper metal layer and the lower metal layer, the second via further being in proximity to the first via; and
further altering, by using the computer, the initial circuit layout design by providing a subresolution assist feature in proximity to the second via,
wherein the altering the initial circuit layout design is used to manufacture integrated circuits or wherein the altering the initial circuit layout design is provided to a fabrication facility to fabricate integrated circuits.

2. The method of claim 1, wherein the second via is in electrical contact with neither the upper metal layer nor the lower metal layer.

3. The method of claim 1, wherein the second via is in electric contact with the lower metal layer but not the upper metal layer.

4. The method of claim 1, further comprising photolithographically printing the lower metal layer, the upper metal layer, the first via, and the second via on a semiconductor wafer.

5. The method of claim 1, further comprising applying a bias to modify the initial circuit layout design.

6. The method of claim 1, further comprising altering the initial circuit layout design by providing a plurality of vias that are in electrical contact with no more than one of the upper metal layer and the lower metal layer.

7. The method of claim 6, wherein at least one of the plurality of vias is in electrical contact with neither the upper metal layer nor the lower metal layer and wherein at least one other of the plurality of vias is in electric contact with the lower metal layer but not the upper metal layer.

8. A system for modifying an integrated circuit layout design, the system comprising:
a display device;
a user input device;
a storage device; and
a processor electronically and communicatively coupled to the display device, the user input device, and the storage device and configured to perform the following procedures:
provide an initial circuit layout design comprising a lower metal layer, an upper metal layer, and a first via electrically connecting the lower metal layer to the upper metal layer;
alter the initial circuit layout design, using the processor, by providing a second via, the second via being in electrical contact with no more than one of the upper metal layer and the lower metal layer, the second via further being in proximity to the first via; and
further alter the initial circuit layout design, using the processor, by providing a subresolution assist feature in proximity to the second via,
wherein the altering the initial circuit layout design is used to manufacture integrated circuits or wherein the altering the initial circuit layout design is provided to a fabrication facility to fabricate integrated circuits.

9. The system of claim 8, wherein the second via is in electrical contact with neither the upper metal layer nor the lower metal layer.

10. The method of claim 8, wherein the second via is in electric contact with the lower metal layer but not the upper metal layer.

11. The method of claim 8, wherein the processor is further configured to apply a bias to modify the initial circuit layout design.

12. The method of claim 8, wherein the processor is further configured to alter the initial circuit layout design by providing a plurality of vias that are in electrical contact with no more than one of the upper metal layer and the lower metal layer.

13. The method of claim 12, wherein at least one of the plurality of vias is in electrical contact with neither the upper metal layer nor the lower metal layer and wherein at least one other of the plurality of vias is in electric contact with the lower metal layer but not the upper metal layer.

* * * * *